US009105375B2

(12) United States Patent
Sugiyama

(10) Patent No.: US 9,105,375 B2
(45) Date of Patent: Aug. 11, 2015

(54) CABLE ASSEMBLY AND METHOD OF MANUFACTURING THE SAME

(71) Applicant: Hitachi Cable, Ltd., Tokyo (JP)

(72) Inventor: Takahiro Sugiyama, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 303 days.

(21) Appl. No.: 13/831,287

(22) Filed: Mar. 14, 2013

(65) Prior Publication Data

US 2014/0138154 A1 May 22, 2014

(51) Int. Cl.

| | |
|---|---|
| ***H02G 15/02*** | (2006.01) |
| ***H01R 4/00*** | (2006.01) |
| ***H01R 9/05*** | (2006.01) |
| ***H01B 7/00*** | (2006.01) |
| ***H01R 43/00*** | (2006.01) |
| ***H01B 13/00*** | (2006.01) |
| ***H01R 9/03*** | (2006.01) |
| ***H01R 12/59*** | (2011.01) |
| *H01R 13/6594* | (2011.01) |
| *H01R 4/02* | (2006.01) |
| *H01R 43/02* | (2006.01) |

(52) U.S. Cl.

CPC ................ *H01B 13/00* (2013.01); *H01R 9/034* (2013.01); *H01R 12/592* (2013.01); *H01R 4/028* (2013.01); *H01R 13/6594* (2013.01); *H01R 43/0263* (2013.01); *Y10T 29/49174* (2015.01)

(58) Field of Classification Search

USPC ......... 174/72 R, 75 C, 78, 88 C, 88 R, 113 R; 29/857; 439/579

See application file for complete search history.

(56) References Cited

U.S. PATENT DOCUMENTS

| | | | | |
|---|---|---|---|---|
| 5,241,135 | A * | 8/1993 | Fetzer | 174/88 R |
| 5,281,762 | A * | 1/1994 | Long et al. | 174/78 |
| 6,380,485 | B1 * | 4/2002 | Beaman et al. | 174/88 R |
| 6,837,741 | B2 * | 1/2005 | Kuwahara | 439/497 |
| 2009/0277665 | A1 * | 11/2009 | Kumamoto et al. | 174/113 R |
| 2012/0061140 | A1 * | 3/2012 | Nonen et al. | 174/84 C |

FOREIGN PATENT DOCUMENTS

JP 2012-99434 A 5/2012

* cited by examiner

*Primary Examiner* — Timothy Thompson
*Assistant Examiner* — Sherman Ng
(74) *Attorney, Agent, or Firm* — McGinn IP Law Group, PLLC

(57) ABSTRACT

Outer-conductor-exposed portions are positioned in respective second body portions of a cable holder, and solder is supplied into solder pools provided in the respective second body portions, whereby outer conductors and ground contacts are connected to each other. Hence, even if the solder is in a molten state, a heated soldering bit does not touch the outer conductors. Therefore, the occurrence of any deformation or melting of insulators is suppressed. Furthermore, since there is no need to caulk any shield connection terminals in such a manner as to conform to the shapes of the outer conductors as in the known art, there is no chance of the insulators undergoing elastic deformation. Hence, the insulators are protected from any factors for thermal deformation and elastic deformation, and electric characteristics of differential signal transmission cables for individual finished products are thus stabilized. Consequently, the reliability of the cable assembly is improved.

10 Claims, 11 Drawing Sheets

CABLE ASSEMBLY AND METHOD OF MANUFACTURING THE SAME

BACKGROUND OF THE INVENTION

1. Field of the Invention

The present invention relates to a cable assembly including a differential signal transmission cable that includes a pair of signal conductors and transmits a differential signal composed of signals having phases that are inverted by 180 degrees with respect to each other, and to a method of manufacturing the same.

2. Description of the Related Art

In known apparatuses such as servers, routers, and storages that handle high-speed digital signals at several Gbit/s or higher, differential interface standards such as low-voltage differential signals (LVDS) are employed, and differential signals are transmitted via differential signal transmission cables between apparatuses or between circuit boards included in each apparatus. A differential signal is characterized in having high resistance to exogenous noise while reducing the voltage of the system power source.

The differential signal transmission cable includes a pair of signal conductors, to which a positive signal and a negative signal having phases that are inverted by 180 degrees with respect to each other are transmitted, respectively. The potential difference between the two signals (the positive signal and the negative signal) corresponds to the signal level, which is identified on the receiver side. For example, if the potential difference is positive, the signal level is “high”; if the potential difference is negative, the signal level is “low”.

A technology concerning a differential signal transmission cable that transmits such a differential signal is disclosed by Japanese Unexamined Patent Application Publication No. 2012-099434 (FIGS. 1 and 2), for example. The differential signal transmission cable disclosed by Japanese Unexamined Patent Application Publication No. 2012-099434 includes a pair of signal conductors that are arranged parallel to each other with a predetermined gap interposed therebetween. The signal conductors are covered with an insulator. Specifically, the signal conductors are held by an insulator in such a manner as to be parallel to each other with a predetermined gap interposed therebetween. The insulator is covered with a sheet-type outer conductor. The outer conductor is covered with a sheath (protective covering).

One end of the differential signal transmission cable is stripped stepwise, whereby portions of the signal conductors and a portion of the outer conductor are exposed to the outside. A shield connection terminal made of metal is connected to the exposed portion of the outer conductor by caulking. The shield connection terminal includes a sheet metal and a soldered connection pin that is integrally formed on the sheet metal. When caulking is performed, the sheet metal undergoes plastic deformation in such a manner as to conform to the shape of the outer conductor. Hence, the outer conductor and the shield connection terminal are electrically connected to each other, allowing electrical connection between the outer conductor and a ground pad of a circuit board via the shield connection terminal (the sheet metal and the soldered connection pin).

In the technology disclosed by Japanese Unexamined Patent Application Publication No. 2012-099434 (FIGS. 1 and 2), a soldering bit used in soldering work and heated to about 350° C. does not touch the outer conductor, unlike a case where the outer conductor is directly soldered to the ground pad. Therefore, the occurrence of deformation or melting of the insulator due to the heat of the soldering bit is suppressed. Nevertheless, since the shield connection terminal is caulked in such a manner as to conform to the shape of the outer conductor, the insulator provided on the inner side of the outer conductor may be elastically deformed by the caulking force, leading to manufacturing problems such as a change in the distance between the signal conductors provided on the inner side of the insulator. Consequently, electric characteristics of finished differential signal transmission cables may vary.

SUMMARY OF THE INVENTION

The present invention provides a cable assembly exhibiting stable electric characteristics for each of finished products and a method of manufacturing the same.

According to a first aspect of the present invention, a cable assembly includes a differential signal transmission cable including a pair of signal conductors, an insulator provided around the signal conductors, and an outer conductor provided around the insulator; a signal-conductor-exposed portion in which portions of the signal conductors are exposed to an outside; an outer-conductor-exposed portion in which a portion of the outer conductor is exposed to the outside, the outer-conductor-exposed portion being on a side of the signal-conductor-exposed portion in a longitudinal direction of the differential signal transmission cable; a cable holder including a first body portion at which the signal-conductor-exposed portion is placed, and a second body portion at which the outer-conductor-exposed portion is placed; signal line contacts provided on the first body portion and to which the signal conductors are connected, respectively; a ground contact extending over the first body portion and the second body portion and to which the outer conductor is connected; and a bonding-material-storing portion provided in the second body portion and storing a bonding material having conductivity that allows connection between the outer conductor and the ground contact.

The cable assembly according to the first aspect of the present invention may further include a leakage prevention wall for preventing leakage of the bonding material toward the first body portion, the leakage prevention wall being provided between the first body portion and the second body portion.

In the cable assembly according to the first aspect of the present invention, the cable holder may further include a guide wall that guides attaching of the differential signal transmission cable to the cable holder. Furthermore, at least one of a stepped portion provided by a combination of the insulator and the outer conductor and a stepped portion provided by a combination of the outer conductor and a protective covering provided around the outer conductor may be in engagement with the guide wall.

In the cable assembly according to the first aspect of the present invention, the differential signal transmission cable may be one of a plurality of differential signal transmission cables. Furthermore, the first body portion may be one of a plurality of first body portions that are provided side by side in a direction that is orthogonal to the longitudinal direction of the differential signal transmission cables. Furthermore, the second body portion may be one of a plurality of second body portions that are provided side by side in the direction that is orthogonal to the longitudinal direction of the differential signal transmission cables.

In the cable assembly according to the first aspect of the present invention, a partition may be provided between adjacent ones of the second body portions such that the bonding-material-storing portion is divided into a plurality of bonding-material-storing portions.

According to a second aspect of the present invention, a method of manufacturing a cable assembly includes preparing a differential signal transmission cable including a pair of signal conductors, an insulator provided around the signal conductors, and an outer conductor provided around the insulator, the preparing of a differential signal transmission cable including forming a signal-conductor-exposed portion in which portions of the signal conductors are exposed to the outside and an outer-conductor-exposed portion in which a portion of the outer conductor is exposed to the outside such that the outer-conductor-exposed portion is on a side of the signal-conductor-exposed portion in a longitudinal direction of the differential signal transmission cable; preparing a cable holder including a first body portion at which the signal-conductor-exposed portion is to be placed, a second body portion at which the outer-conductor-exposed portion is to be placed, signal line contacts provided on the first body portion and to which the signal conductors are to be connected, respectively, a ground contact extending over the first body portion and the second body portion and to which the outer conductor is to be connected, and a bonding-material-storing portion provided in the second body portion and configured to store a bonding material having conductivity that allows connection between the outer conductor and the ground contact; positioning the differential signal transmission cable with respect to the cable holder by placing the signal-conductor-exposed portion at the first body portion and the outer-conductor-exposed portion at the second body portion; connecting the signal conductors and the signal line contacts to each other at the first body portion; and connecting the outer conductor and the ground contact to each other by supplying the bonding material into the bonding-material-storing portion.

In the method of manufacturing a cable assembly according to the second aspect of the present invention, a leakage prevention wall that prevents leakage of the bonding material toward the first body portion may be provided between the first body portion and the second body portion.

In the method of manufacturing a cable assembly according to the second aspect of the present invention, the cable holder may further include a guide wall that guides attaching of the differential signal transmission cable to the cable holder. Furthermore, at least one of a stepped portion provided by a combination of the insulator and the outer conductor and a stepped portion provided by a combination of the outer conductor and a protective covering provided around the outer conductor may be made to engage with the guide wall.

In the method of manufacturing a cable assembly according to the second aspect of the present invention, the differential signal transmission cable may be one of a plurality of differential signal transmission cables. Furthermore, the first body portion may be one of a plurality of first body portions that are provided side by side in a direction that is orthogonal to the longitudinal direction of the differential signal transmission cables. Furthermore, the second body portion may be one of a plurality of second body portions that are provided side by side in the direction that is orthogonal to the longitudinal direction of the differential signal transmission cables.

In the method of manufacturing a cable assembly according to the second aspect of the present invention, a partition may be provided between adjacent ones of the second body portions such that the bonding-material-storing portion is divided into a plurality of bonding-material-storing portions.

In the cable assembly and the method of manufacturing the same according to the above aspects of the present invention, the outer-conductor-exposed portion is placed at the second body portion of the cable holder, and the conductive bonding material is supplied into the bonding-material-storing portion provided in the second body portion, whereby the outer conductor and the ground contact are connected to each other. Hence, even if the bonding material is solder that is in a molten state at about 190° C., a soldering bit heated to about 350° C. does not touch the outer conductor. Therefore, the occurrence of any deformation or melting of the insulator due to the heat of the soldering bit is suppressed. Furthermore, since there is no need to caulk a shield connection terminal in such a manner as to conform to the shape of the outer conductor as in the known art, there is no chance of the insulator undergoing elastic deformation with a caulking force. Hence, the insulator is protected from any factors for thermal deformation (melting) and elastic deformation, and electric characteristics of the differential signal transmission cable for each of individual finished products are thus stabilized. Consequently, the reliability of the cable assembly is improved.

In the cable assembly and the method of manufacturing the same according to the above aspects of the present invention, the leakage prevention wall that prevents the leakage of the bonding material toward the first body portion may be provided between the first body portion and the second body portion. In such a case, the occurrence of failure in which the bonding material may come into contact with any signal conductors is assuredly prevented.

In the cable assembly and the method of manufacturing the same according to the above aspects of the present invention, the guide wall that guides the attaching of the differential signal transmission cable to the cable holder may be provided. Furthermore, at least one of the stepped portion provided by a combination of the insulator and the outer conductor and the stepped portion provided by a combination of the outer conductor and the protective covering provided around the outer conductor may be made to engage with the guide wall. In such a case, the differential signal transmission cable is positioned easily with respect to the cable holder, and the work of assembling the cable assembly is simplified.

In the cable assembly and the method of manufacturing the same according to the above aspects of the present invention, the differential signal transmission cable may be one of a plurality of differential signal transmission cables. Furthermore, the first body portion may be one of a plurality of first body portions that are provided side by side in the direction that is orthogonal to the longitudinal direction of the differential signal transmission cables. Furthermore, the second body portion may be one of a plurality of second body portions that are provided side by side in the direction that is orthogonal to the longitudinal direction of the differential signal transmission cables. In such a case, a plurality of differential signal transmission cables are integrated together while the stability of electric characteristics thereof are maintained. Consequently, the yield rate of finished products each including a plurality of differential signal transmission cables is improved.

In the cable assembly and the method of manufacturing the same according to the above aspects of the present invention, the partition may be provided between adjacent ones of the second body portions such that the bonding-material-storing portion is divided into a plurality of bonding-material-storing portions. In such a case, the amount of bonding material is reduced by an amount corresponding to the volume of the partition. Furthermore, by adjusting the volume of the partition, the amount of bonding material to be supplied for each of the differential signal transmission cables can be optimized. Consequently, electric characteristics of the cable assembly are further stabilized.

DESCRIPTION OF THE PREFERRED EMBODIMENTS

A first embodiment of the present invention will now be described in detail with reference to the accompanying drawings.

Figure 1:
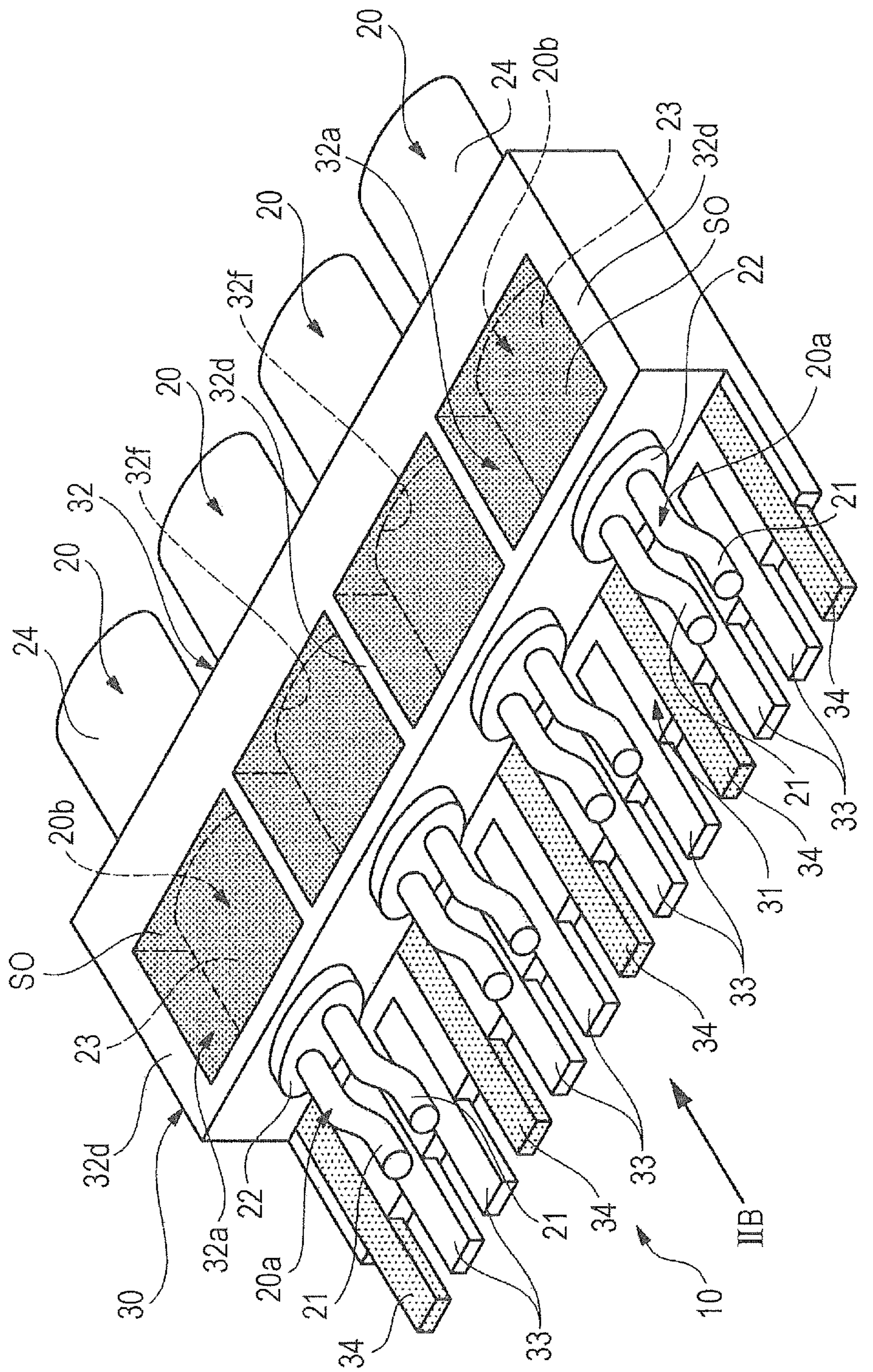
FIG. 1 is a perspective view of a cable assembly according to a first embodiment of the present invention.
Figure 2A:
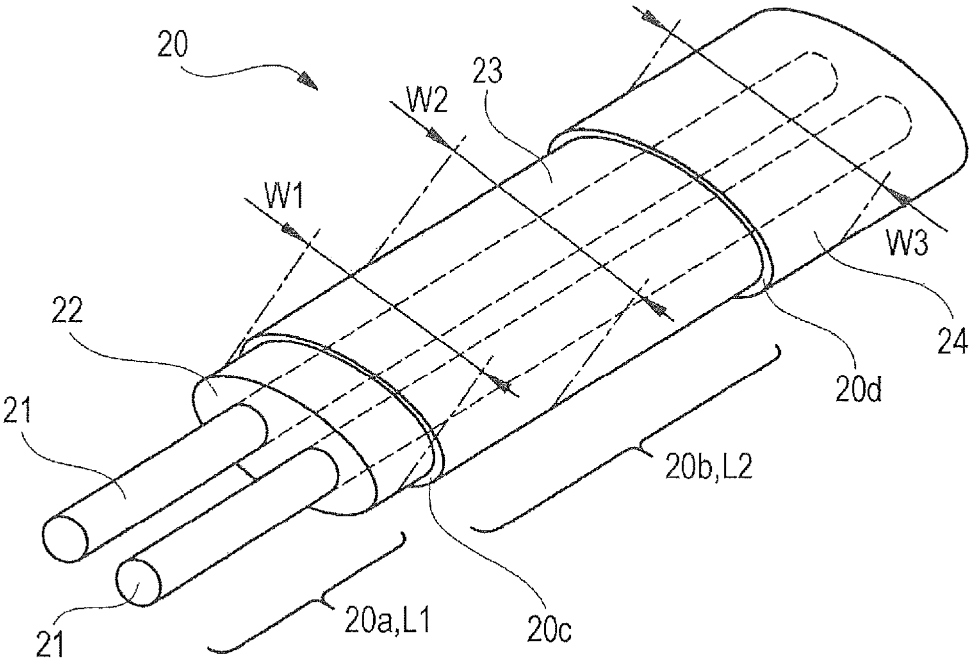
FIG. 2A is a perspective view of one of differential signal transmission cables illustrated in FIG. 1.
Figure 2B:
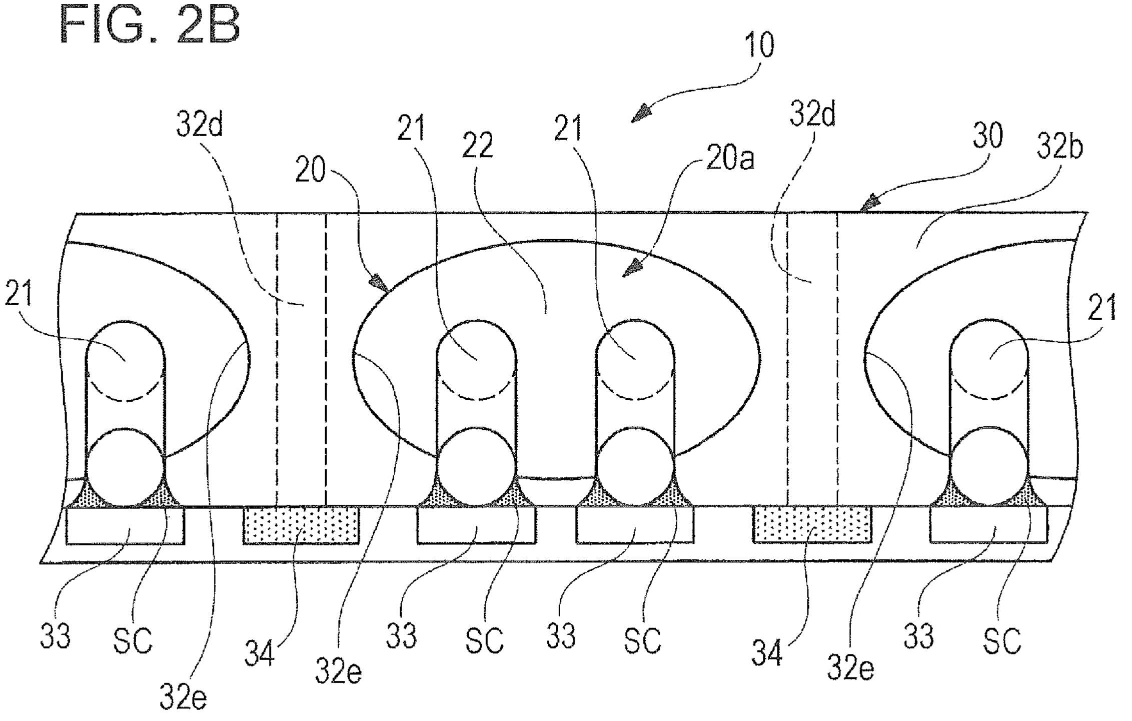
FIG. 2B is an enlarged view of part of the cable assembly illustrated in FIG. 1 that is seen in the direction of arrow IIB.
Figure 3A:
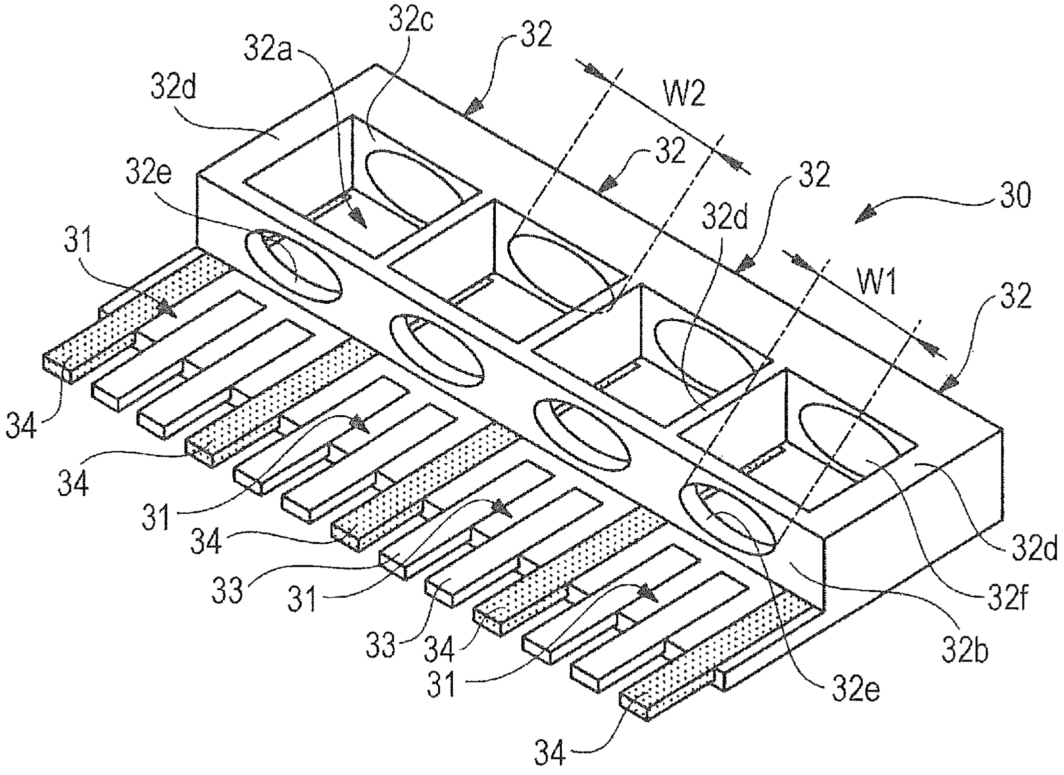
FIG. 3A is a perspective view of a cable holder illustrated in FIG. 1.
Figure 3B:
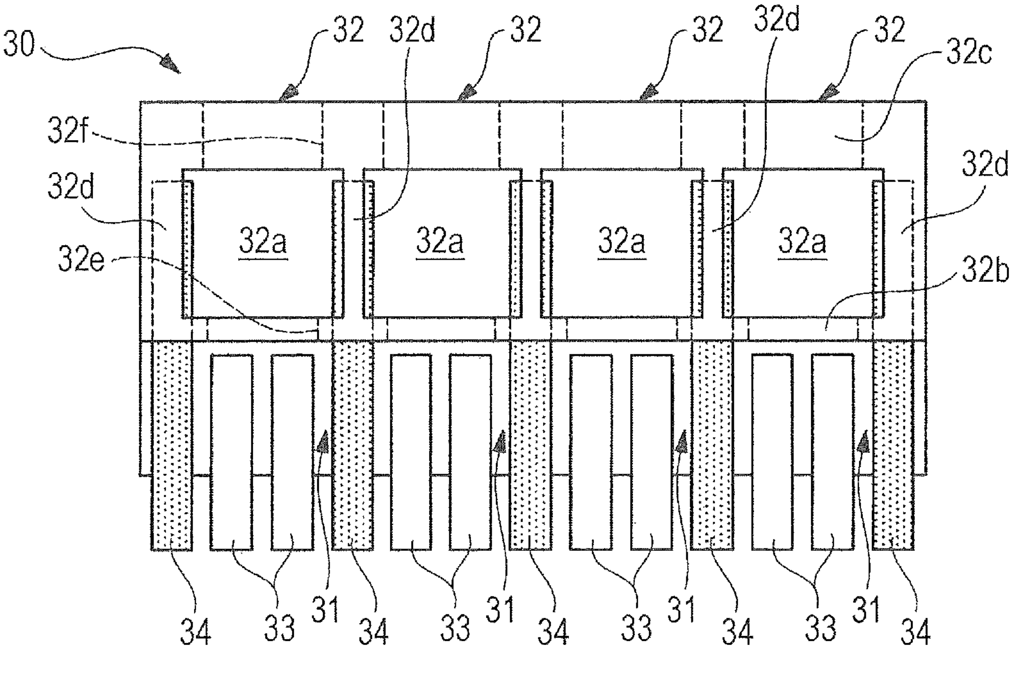
FIG. 3B is a plan view of the cable holder illustrated in FIG. 3A.
Figure 4:
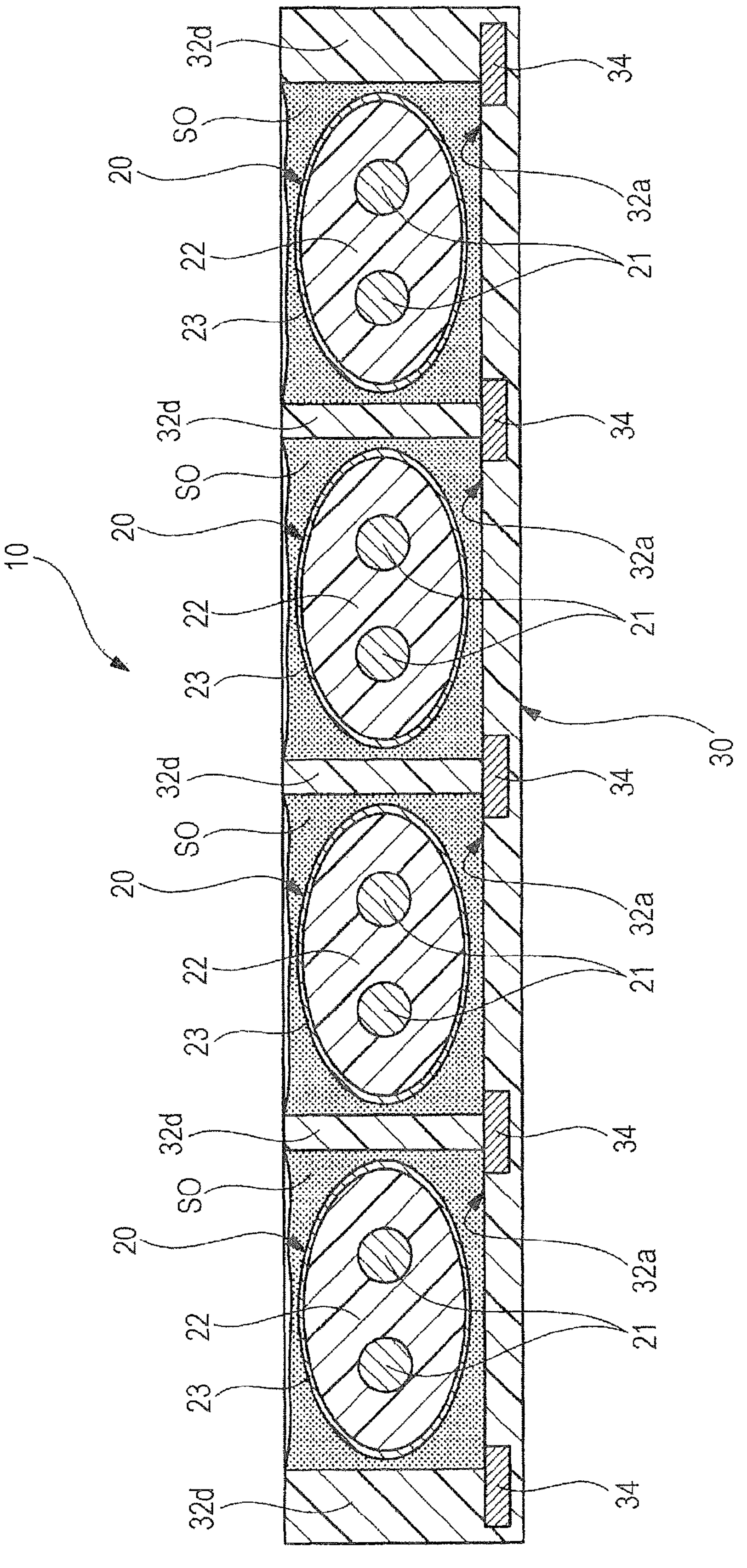
FIG. 4 is a transverse sectional view taken along a line extending across solder pools provided in the cable assembly illustrated in FIG. 1.

FIG. 1 is a perspective view of a cable assembly 10 according to the first embodiment of the present invention. FIG. 2A is a perspective view of one of differential signal transmission cables 20 illustrated in FIG. 1. FIG. 2B is an enlarged view of part of the cable assembly 10 illustrated in FIG. 1 that is seen in the direction of arrow IIB. FIG. 3A is a perspective view of a cable holder 30 illustrated in FIG. 1. FIG. 3B is a plan view of the cable holder 30 illustrated in FIG. 3A. FIG. 4 is a transverse sectional view taken along a line extending across solder pools 32*a* provided in the cable assembly 10 illustrated in FIG. 1.

FIG. 1 illustrates one end of the cable assembly 10. The cable assembly 10 includes a plurality (four in FIG. 1) of differential signal transmission cables 20 and one cable holder 30 that integrates the differential signal transmission cables 20. The cable holder 30 functions as a connector member and is connected to, for example, an interface (not illustrated) of a server that performs high-speed communication. The differential signal transmission cables 20 and the cable holder 30 that are included in the cable assembly 10 are electrically connected to each other via connecting means such as weld or solder.

Referring to FIGS. 2A and 2B, the differential signal transmission cables 20 each include a pair of signal conductors 21. A positive signal as one of components of a differential signal is transmitted to one of the signal conductors 21, while a negative signal as the other component of the differential signal is transmitted to the other signal conductor 21. The signal conductors 21 are each, for example, a tinned annealed copper wire. The signal conductors 21 are covered with an insulator 22.

The insulator 22 is made of, for example, foamed polyethylene so that the differential signal transmission cable 20 is flexible. The insulator 22 has a substantially elliptical cross-sectional shape. The insulator 22 holds the signal conductors 21 with a predetermined gap interposed between the signal conductors 21 and such that the thickness of the insulator 22 around each of the signal conductors 21 are substantially uniform. The melting temperature of foamed polyethylene, which is the material of the insulator 22, is about 120° C.

The cross-sectional shape of the insulator 22 is not limited to the substantially elliptical shape as illustrated in the drawings. For example, the signal conductors 21 may be individually covered with an insulator 22 having a substantially circular cross-sectional shape. Alternatively, the insulator 22 may have a cross-sectional shape defined by a pair of parallel straight lines having an equal length and a pair of semicircular curves, i.e., a shape resembling an athletic track.

The insulator 22 is covered with an outer conductor 23 that reduces the influence of exogenous noise. The outer conductor 23 is made of, for example, a sheet of copper foil and covers most part of the insulator 22 excluding an end in the longitudinal direction. The outer conductor 23 is not limited to copper foil and may be any other metal foil or may be a braided sheet obtained by interlacing thin metal wires such as annealed copper wires.

The outer conductor 23 is covered with a sheath 24 as a protective covering that protects the differential signal transmission cable 20. The sheath 24 covers most part of the outer conductor 23 excluding an end in the longitudinal direction. The sheath 24 is made of, for example, heat-resistant polyvinyl chloride (PVC).

As illustrated in FIG. 2A, the differential signal transmission cable 20 includes, at one end thereof, a signal-conductor-exposed portion 20*a* and an outer-conductor-exposed portion 20*b* that are provided in that order from the tip thereof. That is, the signal-conductor-exposed portion 20*a* and the outer-conductor-exposed portion 20*b* are adjacent to each other in the longitudinal direction of the differential signal transmission cable 20.

The signal-conductor-exposed portion 20*a* is provided by stripping the one end of the differential signal transmission cable 20 stepwise such that the signal conductors 21 are exposed to the outside. The length of the signal-conductor-exposed portion 20*a* in the longitudinal direction of the differential signal transmission cable 20 is set to L1. The length L1 of the signal-conductor-exposed portion 20*a*, i.e., the length L1 of a portion where the signal conductors 21 are exposed, is such a length that the signal-conductor-exposed portion 20*a* can be easily formed into a stepped shape (see FIG. 6) when the signal-conductor-exposed portion 20*a* is connected to corresponding ones of signal line contacts 33 included in the cable holder 30.

Setting the length L1 as described above makes it difficult for the heat (about 350° C.) of a soldering bit used in soldering the signal-conductor-exposed portion 20*a* (the signal conductors 21) to the signal line contacts 33 to be transferred to the insulator 22. Hence, the work of electrically connecting the signal conductors 21 to the signal line contacts 33 is facilitated.

The surfaces of the signal conductors 21 are tinned as described above and have increased solder wettability. Therefore, high-quality soldering is realized (solder fillets SC are formed, see the dark hatched portions in FIG. 2B).

As described above, before the differential signal transmission cable 20 is connected to the cable holder 30, the signal conductors 21 are each formed into a stepped shape. Each signal conductor 21 has a circular cross-sectional shape. Therefore, a stress applied to the signal conductor 21 in the forming is prevented from locally concentrating, whereby breakage or the like of the signal conductor 21 is prevented.

The outer-conductor-exposed portion 20*b* is provided by stripping the one end of the differential signal transmission cable 20 stepwise such that the outer conductor 23 is exposed to the outside. The length of the outer-conductor-exposed portion 20*b* in the longitudinal direction of the differential signal transmission cable 20 is set to L2. The outer-conductor-exposed portion 20*b* is exposed in a corresponding one of the solder pools 32*a* (see FIGS. 1, 3A, 3B, and 4) provided in the cable holder 30. Hence, when solder SO (see the dark hatched portions illustrated in FIGS. 1 and 4) is dropped (supplied) into the solder pool 32*a*, the outer-conductor-exposed portion 20*b* and corresponding ones of ground contacts 34 exposed in the solder pool 32*a* are electrically connected to each other.

The length L2 of the outer-conductor-exposed portion 20*b*, i.e., the length L2 of a portion where the outer conductor 23 is exposed, is set larger than the length L1 of the portions where the signal conductors 21 are exposed (L2>L1). Hence, the solder SO dropped into the solder pool 32*a* spreads over a relatively wide area of the outer conductor 23, so that the heat (about 190° C.) of the solder SO is dispersed quickly. Accordingly, concentration and transfer of the heat of the solder SO on and to any part of the outer conductor 23 is suppressed, preventing the occurrence of deformation and melting of the insulator 22 due to the heat of the dropped solder SO.

The widths, i.e., the lengths of the major axes of the respective elliptical shapes, of the insulator 22, the outer conductor 23, and the sheath 24 are set to W1, W2, and W3, respectively (W1<W2<W3). Accordingly, as illustrated in FIG. 2A, a first stepped portion (stepped portion) 20*c* and a second stepped portion (stepped portion) 20*d* are provided. The first stepped portion 20*c* is provided by a combination of the insulator 22 and the outer conductor 23. The second stepped portion 20*d* is provided by a combination of the outer conductor 23 and the sheath 24.

The first stepped portion 20*c* is engageable with a corresponding one of first guide holes 32*e* (see FIGS. 2B, 3A, and 3B) provided in a leakage prevention wall 32*b* defining the solder pools 32*a*. The second stepped portion 20*d* is engageable with a corresponding one of second guide holes 32*f* (see FIGS. 3A and 3B) provided in a guide wall 32*c* defining the solder pools 32*a*. That is, the stepped portions 20*c* and 20*d* and the guide holes 32*e* and 32*f* position the differential signal transmission cable 20 with respect to the cable holder 30 and thus facilitate the attaching of the differential signal transmission cable 20 to the cable holder 30.

and 20*d* engage with the guide holes 32*e* and 32*f*, respectively, as described above, only the first stepped portion 20*c* may be made to engage with the first guide hole 32*e* while the length L2 of the exposed portion of the outer conductor 23 is set to a large value, for example, or only the second stepped portion 20*d* may be made to engage with the second guide hole 32*f* while the length L2 of the exposed portion of the outer conductor 23 is set to a short value.

Referring to FIGS. 3A and 3B, the cable holder 30 is formed into a predetermined shape by, for example, injection-molding a heat-resistant resin material (having a melting point of 200° C. or higher) including engineering plastics such as polyphenylene sulfide (PPS) or liquid crystal polymer (LCP). The cable holder 30 thus obtained includes four first body portions 31 and four second body portions 32 in correspondence with the four differential signal transmission cables 20. The first body portions 31 are provided side by side in a direction that is orthogonal to the longitudinal direction of the differential signal transmission cables 20, and so are the second body portions 32 (see FIG. 1). The numbers of first body portions 31 and second body portions 32 are arbitrary. Moreover, the present invention is applicable to a case where only one first body portion 31 and one second body portion 32 are provided.

The first body portions 31 are each a thin member. The signal-conductor-exposed portion 20*a* of each differential signal transmission cable 20 is placed on corresponding ones of the first body portions 31 (see FIG. 1). A pair of signal line contacts 33 and a pair of ground contacts 34 are embedded in each first body portion 31 by insert molding with some portions (upper surfaces) thereof exposed to the outside. Each ground contact 34 provided between adjacent ones of the first body portions 31 and adjacent ones of the second body portions 32 is shared by the adjacent first body portions 31 and the adjacent second body portions 32. That is, the ground contact 34 between adjacent ones of the first body portions 31 and adjacent ones of the second body portions 32 extends over the adjacent first body portions 31 and the adjacent second body portions 32.

For clear distinction between the signal line contacts 33 and the ground contacts 34, the ground contacts 34 are lightly hatched in the drawings.

The signal line contacts 33 and the ground contacts 34 are made of brass or the like having superior conductivity and each have a long narrow plate-like shape. The length of the signal line contacts 33 is set shorter than the length of the ground contacts 34. The signal line contacts 33 and the ground contacts 34 are arranged side by side at substantially regular intervals on the first body portions 31.

The ground contacts 34 extend in the longitudinal direction of the differential signal transmission cables 20 and into the second body portions 32. Portions of the ground contacts 34 on a side thereof in the longitudinal direction that extend in the second body portions 32 are exposed in the solder pools 32*a* provided in the second body portions 32.

Two ground contacts 34 are provided on two respective sides of each pair of signal line contacts 33 that are provided in correspondence with the signal conductors 21. In this manner, the right and left signals transmitted through each pair of signal conductors 21 are kept in good balance, and the occurrence of failure such as reflections of high-speed signals is suppressed, whereby stable transmission of high-speed signals is realized.

Referring to FIGS. 3A and 3B, the second body portions 32 are thicker than the first body portions 31. The outer-conductor-exposed portions 20*b* of the differential signal transmission cables 20 are placed on the second body portions 32 (see FIG. 1). The second body portions 32 have the respective solder pools 32*a*, which have a substantially box-like shape. Solder SO (see FIG. 1) as a conductive bonding material is to be dropped into the solder pools 32*a*. The solder pools 32*a* each correspond to a bonding-material-storing portion according to the present invention. The solder SO is stored in the solder pools 32*a*. Consequently, the outer conductors 23 and the ground contacts 34 are electrically connected to each other.

The solder pools 32*a* are each defined by the leakage prevention wall 32*b*, the guide wall 32*c*, and a corresponding pair of sidewalls 32*d*. Some of the sidewalls 32*d* that are each provided between adjacent ones of the second body portions 32 are shared by the adjacent second body portions 32. That is, the sidewall 32*d* provided between adjacent ones of the second body portions 32 separates corresponding ones of the solder pools 32*a* that are adjacent to each other. Such a sidewall 32*d* corresponds to a partition according to the present invention.

The leakage prevention wall 32*b* is provided between the first body portions 31 and the second body portions 32. The leakage prevention wall 32*b* prevents molten solder SO that is to be dropped into the solder pools 32*a* from leaking out of the solder pools 32*a* toward the first body portions 31. Thus, the occurrence of any short circuits between the signal line contacts 33 and the ground contacts 34 due to the solder SO is assuredly prevented.

The leakage prevention wall 32*b* has the first guide holes 32*e* through which the first body portions 31 and the second body portions 32 communicate with each other. The insulators 22 of the differential signal transmission cables 20 fit the first guide holes 32*e* with no gaps therebetween (see FIG. 1). That is, a width W1 of each first guide hole 32*e* is substantially equal to a width W1 of each insulator 22 (W1=W1).

The first guide holes 32*e* guide the attaching of the differential signal transmission cables 20 to the cable holder 30. The first stepped portions 20*c* of the differential signal transmission cables 20 engage with the first guide holes 32*e* (the leakage prevention wall 32*b*). The leakage prevention wall 32*b* also functions as a guide wall according to the present invention.

The guide wall 32*c* is provided on a side (upper side in FIG. 3B) of the second body portions 32 from which the differential signal transmission cables 20 are to be inserted therethrough in a process of assembling the cable assembly 10. The guide wall 32*c* has the second guide holes 32*f*. The outer conductors 23 of the differential signal transmission cables 20 fit the second guide holes 32*f* with no gaps therebetween (see FIG. 1). That is, a width W2 of each second guide hole 32*f* is substantially equal to a width W2 of each outer conductor 23 (W2=W2).

The guide wall 32*c* prevents molten solder SO that is to be dropped into the solder pools 32*a* from leaking out of the solder pools 32*a* toward a side on the other end (the upper side in FIG. 3B) of the differential signal transmission cables 20. The second guide holes 32*f* guide the attaching of the differential signal transmission cables 20 to the cable holder 30 in the process of assembling the cable assembly 10. The second stepped portions 20*d* of the differential signal transmission cables 20 engage with the second guide holes 32*f* (the guide wall 32*c*).

A method of assembling (manufacturing) the cable assembly 10 configured as described above will now be described in detail with reference to associated drawings.

Figure 5:
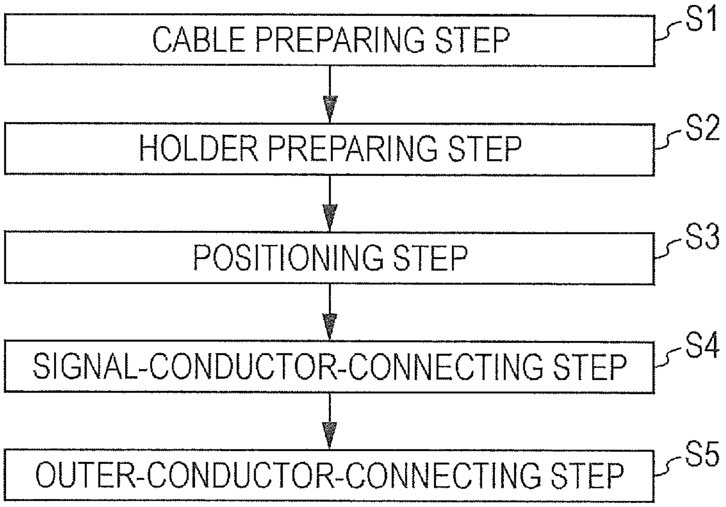
FIG. 5 is a flow chart illustrating a process of manufacturing (assembling) the cable assembly illustrated in FIG. 1.
Figure 6:
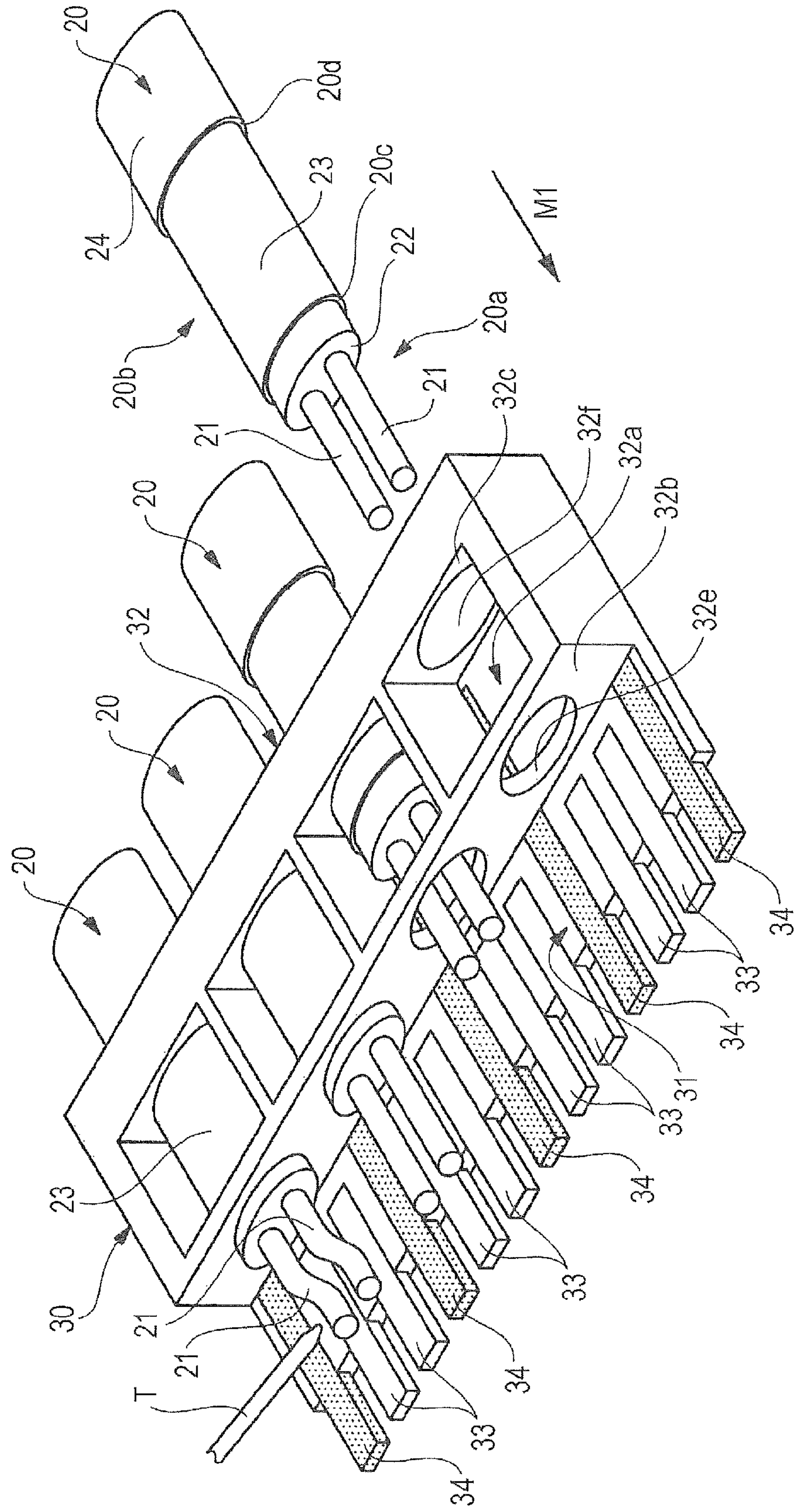
FIG. 6 illustrates a positioning step and a signal-conductor-connecting step.
Figure 7:
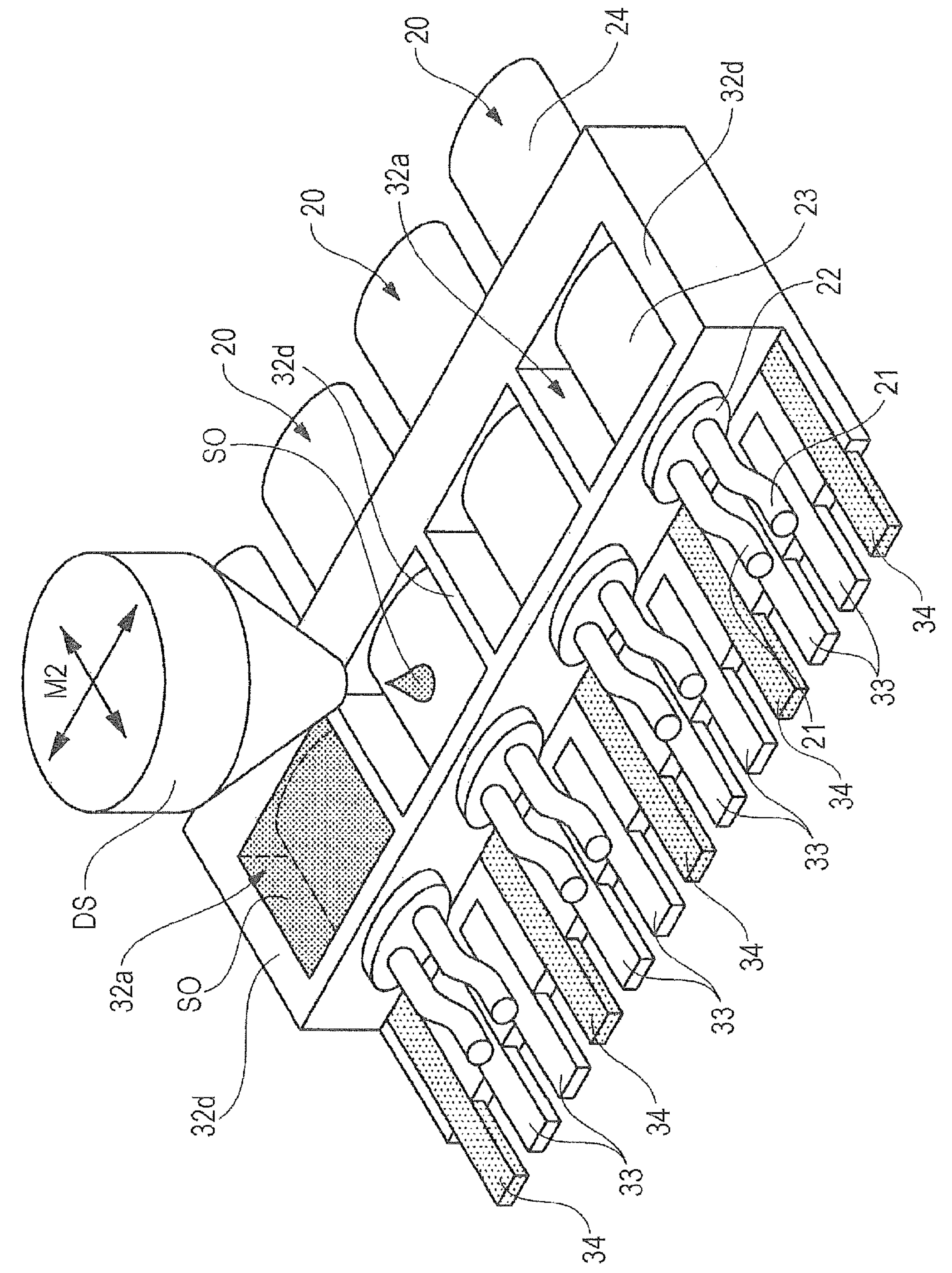
FIG. 7 illustrates an outer-conductor-connecting step.
Figure 8:
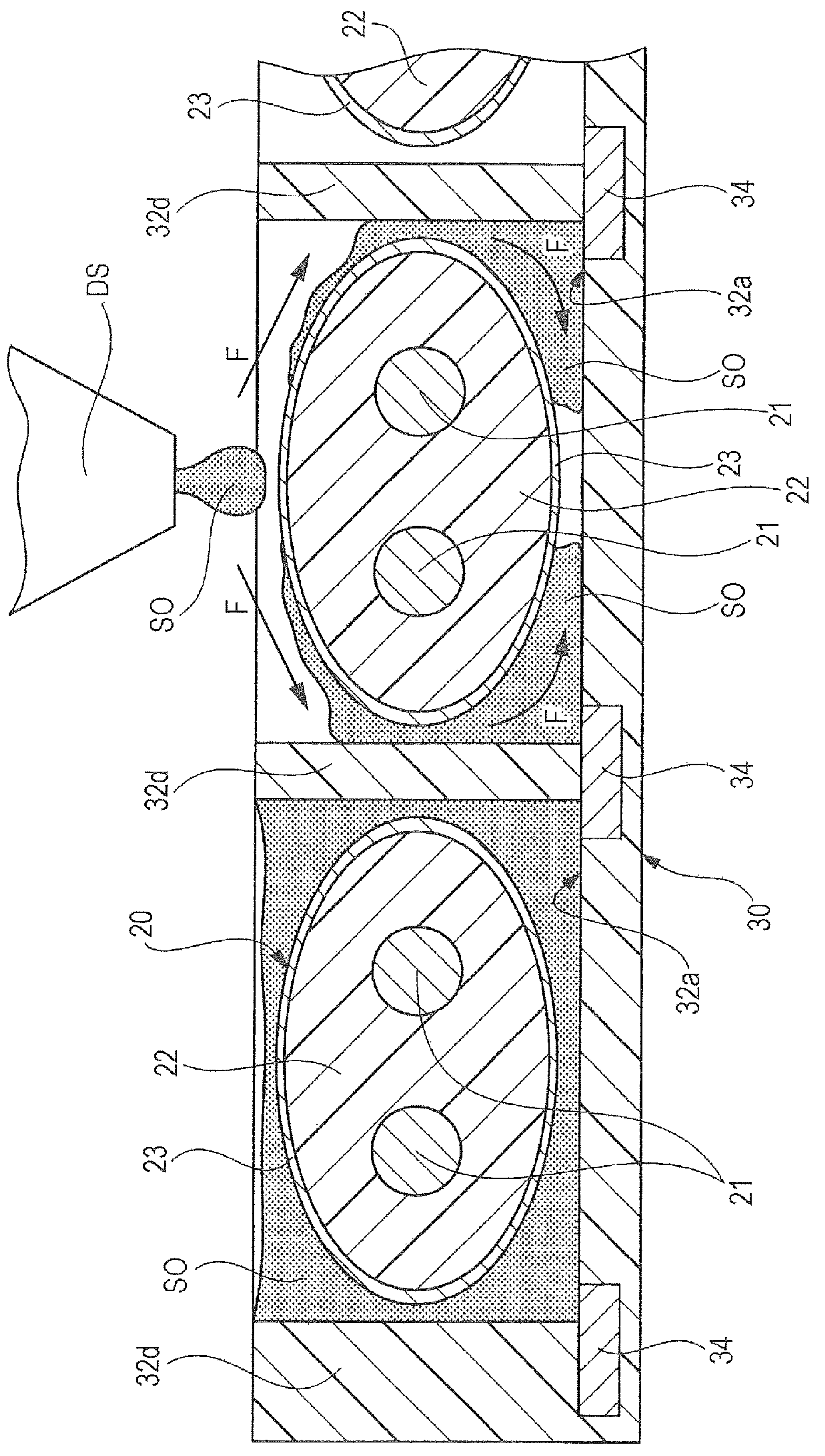
FIG. 8 is a transverse sectional view corresponding to FIG. 4 and illustrates the outer-conductor-connecting step.

FIG. 5 is a flow chart illustrating a process (steps S1 to S5) of manufacturing (assembling) the cable assembly 10 illustrated in FIG. 1. FIG. 6 illustrates a positioning step (step S3) and a signal-conductor-connecting step (step S4). FIG. 7 illustrates an outer-conductor-connecting step (step S5). FIG. 8 is a transverse sectional view corresponding to FIG. 4 and illustrates the outer-conductor-connecting step (step S5).

Cable Preparing Step

In step S1 in FIG. 5, cable base members (not illustrated) manufactured through another manufacturing process are prepared. The cable base members each include a pair of signal conductors 21, an insulator 22 provided around the signal conductors 21, an outer conductor 23 provided around the insulator 22, and a sheath 24 provided around the outer conductor 23, with ends thereof unstripped. That is, the cable base members correspond to differential signal transmission cables 20 with no signal-conductor-exposed portions 20*a* and no outer-conductor-exposed portions 20*b*.

In the cable preparing step, an end of each of the cable base members thus prepared is stripped stepwise sequentially, whereby a signal-conductor-exposed portion 20*a* and an outer-conductor-exposed portion 20*b* are formed (see FIG. 6). In this manner, a plurality of differential signal transmission cables 20 are obtained, and the cable preparing step ends.

Holder Preparing Step

In step S2 in FIG. 5, a cable holder 30 manufactured through yet another manufacturing process is prepared. The cable holder 30 is formed by using an injection molding apparatus (not illustrated). Specifically, the injection molding apparatus includes, for example, a lower mold configured to hold signal line contacts 33 and ground contacts 34, and an upper mold that is movable up and down with respect to the lower mold. Molten resin is injected from a dispenser into a cavity that is provided by joining the molds, whereby a cable holder 30 having a predetermined shape as illustrated in FIGS. 3A and 3B is obtained.

The differential signal transmission cables 20 and the cable holder 30 are prepared separately through the cable preparing step S1 and the holder preparing step S2. Therefore, the order of step S1 and step S2 may be reversed. That is, step S1 may be the holder preparing step, and step S2 may be the cable preparing step.

Positioning Step

In step S3 in FIG. 5, four differential signal transmission cables 20 are set at respective predetermined positions of the cable holder 30. As illustrated by arrow M1 in FIG. 6, the signal-conductor-exposed portion 20*a* (the tip) of each of the differential signal transmission cables 20 is placed against the guide wall 32*c* forming the second body portions 32 and is inserted into a corresponding one of the second guide holes 32*f* and then a corresponding one of the first guide holes 32*e* provided in the leakage prevention wall 32*b*. Furthermore, the first stepped portion 20*c* of the differential signal transmission cable 20 is made to engage with the leakage prevention wall 32*b*, and the second stepped portion 20*d* of the differential signal transmission cable 20 is made to engage with the guide wall 32*c*.

In this manner, the signal-conductor-exposed portions 20*a* are set at predetermined positions of the respective first body portions 31, and the outer-conductor-exposed portions 20*b* are set at predetermined positions of the respective second body portions 32, i.e., in the respective solder pools 32*a*. Thus, the differential signal transmission cables 20 are set at the predetermined positions of the cable holder 30, and the positioning step ends.

Signal-Conductor-Connecting Step

In step S4 in FIG. 5, the signal conductors 21 (the signal-conductor-exposed portions 20*a*) that have been set at the predetermined positions of the first body portions 31 are each formed into a stepped shape as illustrated in FIG. 6, whereby the tips of the signal conductors 21 are brought into contact with the respective signal line contacts 33. Subsequently, the signal conductors 21 are soldered to the respective signal line contacts 33 on the first body portions 31 by using a soldering tool T. In this manner, the signal conductors 21 and the signal line contacts 33 are electrically connected to each other. Thus, the signal-conductor-connecting step ends.

Outer-Conductor-Connecting Step

In step S5 in FIG. 5, referring to FIG. 7, a predetermined amount of molten solder SO is dropped from a solder dispenser DS into each of the solder pools 32*a* of the second body portions 32. The molten solder SO thus dropped spreads into the gap between the solder pool 32*a* and the outer conductor 23 and reaches the bottom of the solder pool 32*a* as illustrated by arrows F in FIG. 8. In this manner, the solder SO fills gaps between the outer conductor 23 and corresponding two of the ground contacts 34, whereby the outer conductor 23 and the ground contacts 34 are electrically connected to each other, and the outer-conductor-connecting step ends. Thus, the process of assembling the cable assembly 10 ends.

To prevent the molten solder SO that is dropped from the solder dispenser DS from being dropped locally onto a certain point of each outer conductor 23 and thus melting or deforming a corresponding part of the insulator 22, the solder dispenser DS is slightly moved in four horizontal directions as illustrated by arrows M2 in FIG. 7. In this manner, even if the solder SO to be dropped is at about 190° C., the occurrence of any damage (melting or deformation) to the foamed polyethylene having a melting temperature of about 120° C. is suppressed.

Furthermore, since the sidewalls 32*d* are each provided between adjacent ones of the second body portions 32, the amount of solder SO to be dropped into the solder pools 32*a* is reduced by an amount corresponding to the volume of the sidewalls 32*d*. Accordingly, the weight of the cable assembly 10 is reduced, and electric characteristics of the cable assembly 10 are improved. With the reduction in the amount of solder SO by providing the sidewalls 32*d*, the period of time for which the outer conductors 23 (the insulators 22) are exposed to the heat of the solder SO is shorter than that in a cable assembly not including the sidewalls 32*d*. The amount of solder SO, i.e., the volume of the sidewalls 32*d*, is adjustable in accordance with the type of the solder SO and the required connection strength.

Instead of hot solder SO, the conductive bonding material may be conductive adhesive (such as epoxy resin containing metal powder) that does not need to be heated. In that case, problems concerning heat can be ignored. Hence, the sidewalls 32*d* may be omitted. Alternatively, for example, a low-temperature solder having a melting point of about 100° C. or lower (an alloy having a low melting point) may be used.

The order of the signal-conductor-connecting step S4 and the outer-conductor-connecting step S5 may be reversed. That is, step S4 may be the outer-conductor-connecting step, and step S5 may be the signal-conductor-connecting step.

As detailed above, in the cable assembly 10 and the method of manufacturing the same according to the first embodiment, the outer-conductor-exposed portions 20*b* are positioned in the respective second body portions 32 of the cable holder 30, and solder SO is supplied into the solder pools 32*a* provided in the respective second body portions 32, whereby the outer conductors 23 and the ground contacts 34 are connected to each other. Hence, even if the solder SO is in a molten state at about 190° C., the soldering bit heated to about 350° C. does not touch the outer conductors 23. Therefore, the occurrence of any deformation or melting of the insulators 22 due to the heat of the soldering bit is suppressed. Furthermore, since there is no need to caulk any shield connection terminals in such a manner as to conform to the shapes of the outer conductors as in the known art, there is no chance of the insulators 22 undergoing elastic deformation with a caulking force. Hence, the insulators 22 are protected from any factors for thermal deformation (melting) and elastic deformation, and electric characteristics of the differential signal transmission cables 20 for individual finished products are thus stabilized. Consequently, the reliability of the cable assembly 10 is improved.

In the cable assembly 10 and the method of manufacturing the same according to the first embodiment, the leakage prevention wall 32*b* that prevents the leakage of the solder SO toward the first body portions 31 is provided between the first body portions 31 and the second body portions 32. Therefore, the occurrence of failure (short circuit) in which the solder SO may come into contact with any signal conductors 21 is assuredly prevented.

In the cable assembly 10 and the method of manufacturing the same according to the first embodiment, the guide wall 32*c* that guides the attaching of the differential signal transmission cables 20 to the cable holder 30 and the leakage prevention wall 32*b* are provided, and the first stepped portions 20*c* and the second stepped portions 20*d* are made to engage with the guide wall 32*c* and the leakage prevention wall 32*b*, respectively. Therefore, the differential signal transmission cables 20 are positioned easily with respect to the cable holder 30, and the work of assembling the cable assembly 10 is simplified.

In the cable assembly 10 and the method of manufacturing the same according to the first embodiment, the cable holder 30 includes a plurality (four in the first embodiment) of first body portions 31 that are arranged side by side in the direction that is orthogonal to the longitudinal direction of the differential signal transmission cables 20, and a plurality (four in the first embodiment) of second body portions 32 that are arranged likewise. Therefore, a plurality of differential signal transmission cables 20 are integrated together while the stability of electric characteristics thereof are maintained. Consequently, the yield rate of finished products each including a plurality of differential signal transmission cables 20 is improved.

In the cable assembly 10 and the method of manufacturing the same according to the first embodiment, the sidewalls 32*d* that separate the solder pools 32*a* are each provided between adjacent ones of the second body portions 32. Therefore, the amount of solder SO is reduced by an amount corresponding to the volume of the sidewalls 32*d*. Furthermore, by adjusting the volume of the sidewalls 32*d*, the amount of solder SO to be supplied for each of the differential signal transmission cables 20 can be optimized. Consequently, electric characteristics of the cable assembly 10 are further stabilized.

A second embodiment and a third embodiment of the present invention will now be described in detail with reference to associated drawings. Elements having the same functions as those described in the first embodiment are denoted by the corresponding reference numerals, and detailed description thereof is omitted.

Figure 9A:
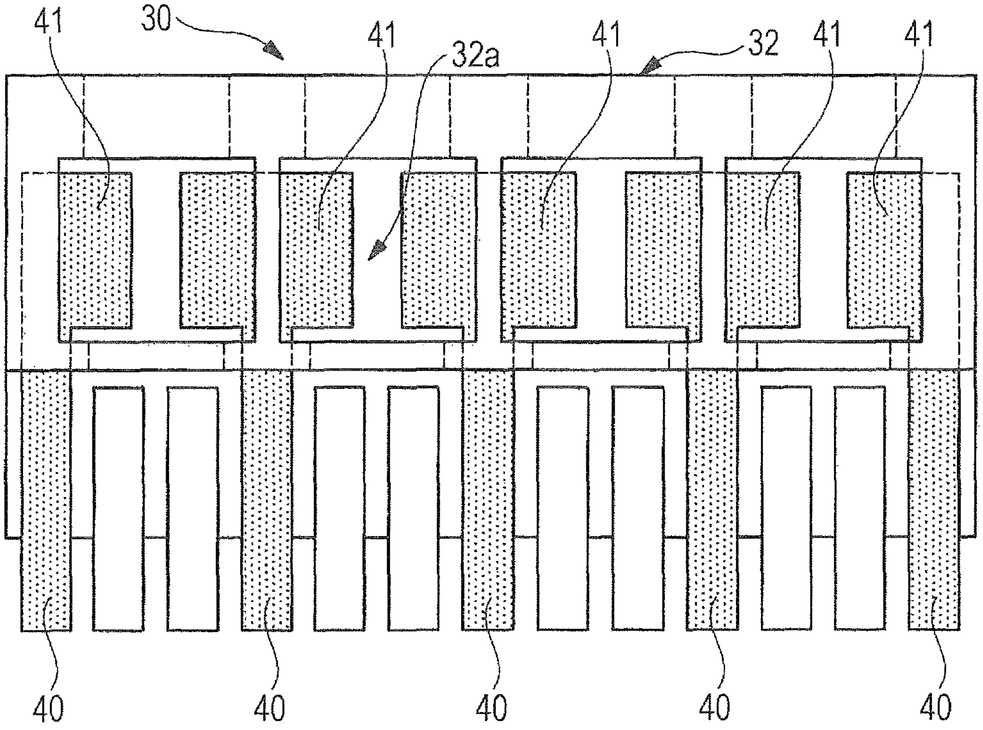
FIG. 9A is a plan view illustrating a cable holder included in a cable assembly according to a second embodiment of the present invention.
Figure 9B:
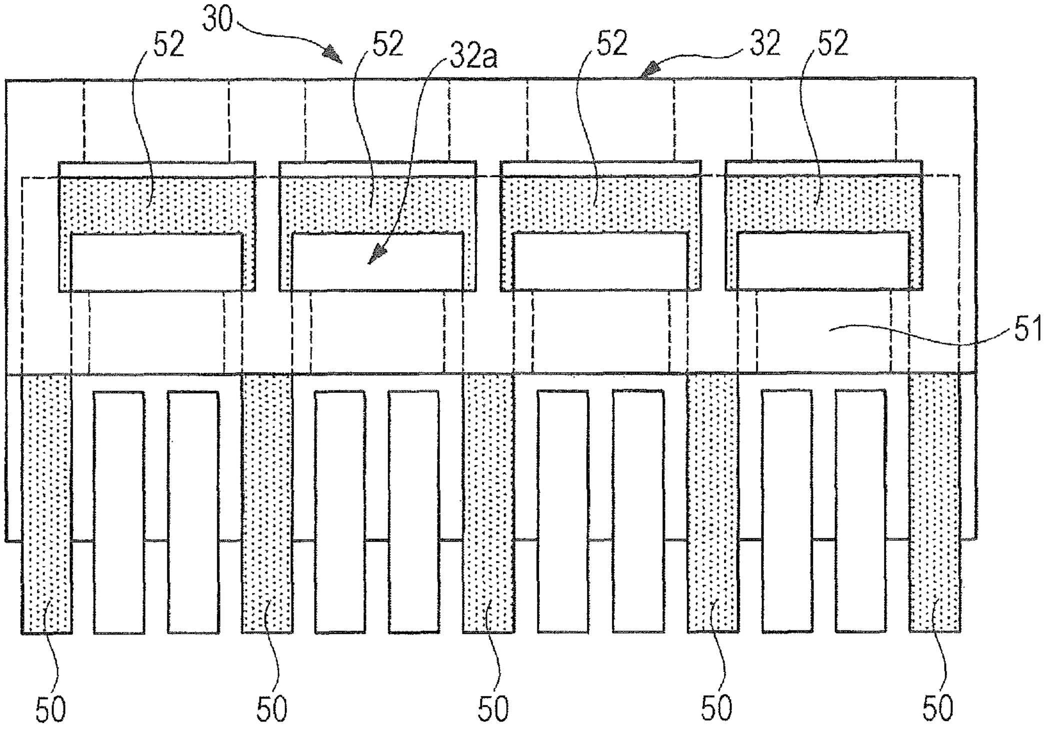
FIG. 9B is a plan view illustrating a cable holder included in a cable assembly according to a third embodiment of the present invention.

FIGS. 9A and 9B are plan views illustrating cable holders 30 included in cable assemblies according to the second embodiment and the third embodiment, respectively.

Referring to FIG. 9A, the second embodiment differs from the first embodiment only in the shape of the ground contacts that are embedded into the cable holder 30 by insert molding. Ground contacts 40 include wide portions 41, respectively, provided on a side thereof in the longitudinal direction extending over the second body portions 32. The wide portions 41 are exposed in the solder pools 32*a*.

In such a configuration according to the second embodiment also, the advantageous effects produced in the first embodiment are produced. In addition, in the second embodiment, the area of portions of the ground contacts 40 that are exposed in the solder pools 32*a* is increased. Therefore, in the solder pools 32*a*, the outer conductors 23 (see FIG. 1) of the differential signal transmission cables 20 and the ground contacts 40 are electrically connected to each other more assuredly via the solder SO (see FIG. 1) and the wide portions 41.

Referring to FIG. 9B, the third embodiment differs from the first embodiment in the shape of the ground contacts and in that the leakage prevention wall has a larger thickness. Ground contacts 50 are connected to one another with a bridge portion 52 provided on a side thereof in the longitudinal direction extending over the second body portions 32. That is, the ground contacts 50 are provided as an integral member by providing the bridge portion 52. The bridge portion 52 extends across the solder pools 32*a* and is exposed in the solder pools 32*a*. A leakage prevention wall 51 has a thickness in the longitudinal direction of the differential signal transmission cables 20 (the vertical direction in FIG. 9B) that is substantially three-times larger than the leakage prevention wall 32*b* according to the first embodiment. Hence, the capacity of each solder pool 32*a* is smaller than that of the first embodiment.

In such a configuration according to the third embodiment also, the advantageous effects produced in the first embodiment are produced. In addition, in the third embodiment, the ground contacts 50 are provided as a single member. Therefore, the number of components is reduced. Furthermore, the capacity of each solder pool 32*a* is reduced. Therefore, the stiffness of the second body portions 32 is increased while reducing the amount of solder SO to be supplied into the solder pool 32*a*. Although the capacity of each of the solder pools 32*a* is smaller than in the first embodiment, the bridge portion 52 is exposed in the solder pools 32*a* by a sufficient area. Therefore, there are no problems with the electric characteristics of the cable assembly 10.

A fourth embodiment of the present invention will now be described in detail with reference to associated drawings. Elements having the same functions as those described in the first embodiment are denoted by the corresponding reference numerals, and detailed description thereof is omitted.

Figure 10:
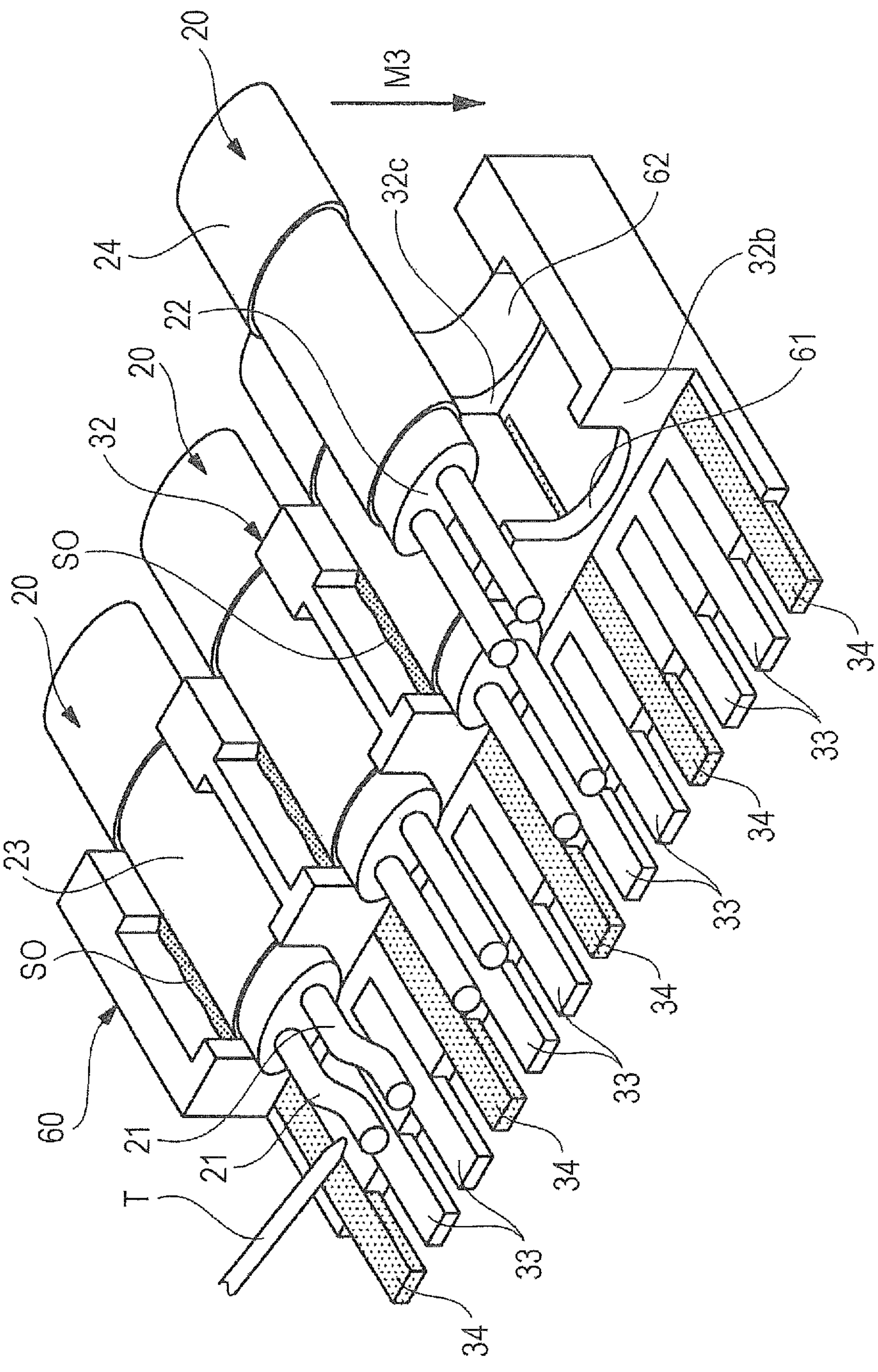
FIG. 10 is a perspective view of a cable holder included in a cable assembly according to a fourth embodiment of the present invention.

FIG. 10 is a perspective view of a cable holder 60 included in a cable assembly according to the fourth embodiment.

As illustrated in FIG. 10, the fourth embodiment differs from the first embodiment only in the shape of the cable holder. A cable holder 60 includes a leakage prevention wall 32*b* and a guide wall 32*c*. The leakage prevention wall 32*b* and the guide wall 32*c* have first guiding cuts 61 and second guiding cuts 62, respectively, provided in correspondence with the second body portions 32. Hence, the differential signal transmission cables 20 are attachable to the cable holder 60 also in a direction represented by arrow M3 in FIG. 10. To prevent the leakage of solder SO that may occur by the presence of the first guiding cuts 61 and the second guiding cuts 62, the amount of solder SO to be supplied into the solder pools 32*a* is set smaller than in the first embodiment.

In such a configuration according to the fourth embodiment also, the advantageous effects produced in the first embodiment are produced. In addition, in the fourth embodiment, since the first guiding cuts 61 and the second guiding cuts 62 are provided, the weight of the cable holder 60 is reduced. Furthermore, the degree of freedom in attaching the differential signal transmission cables 20 to the cable holder 60 is increased. Therefore, the assembling work becomes easier. In the fourth embodiment, the ground contacts 40 or 50 (see FIGS. 9A and 9B) according to the second or third embodiment may also be employed.

A fifth embodiment of the present invention will now be described in detail with reference to associated drawings. Elements having the same functions as those described in the first embodiment are denoted by the corresponding reference numerals, and detailed description thereof is omitted.

Figure 11:
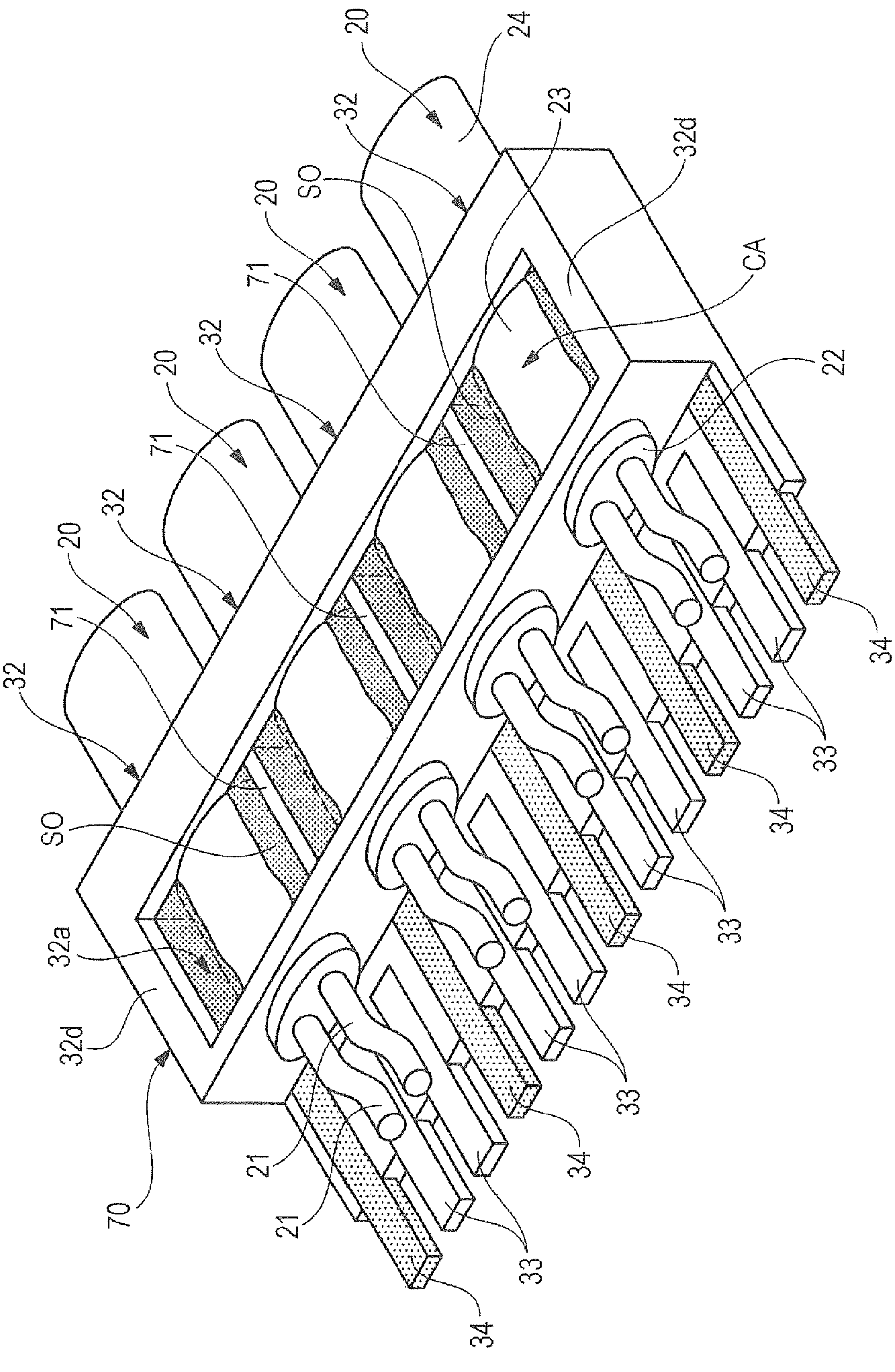
FIG. 11 is a perspective view of a cable holder included in a cable assembly according to a fifth embodiment of the present invention.

FIG. 11 is a perspective view of a cable holder 70 included in a cable assembly according to the fifth embodiment.

As illustrated in FIG. 11, the fifth embodiment differs from the first embodiment only in the shape of the sidewalls included in the cable holder. A cable holder 70 includes sidewalls 71 each provided between adjacent ones of the second body portions 32. That is, three sidewalls 71 are provided in total for the four differential signal transmission cables 20. The height of the sidewalls 71 is lower than the height of a pair of sidewalls 32*d* provided on two outer sides of a unit of the four second body portions 32 separated by the sidewalls 71. Hence, a depression CA extends over the solder pools 32*a* provided in the second body portions 32.

In such a configuration according to the fifth embodiment also, the advantageous effects produced in the first embodiment are produced. In addition, in the fifth embodiment, the capacity of each solder pool 32*a* is reduced. Therefore, the amount of solder SO to be supplied into the solder pools 32*a* is reduced. Furthermore, the depression CA is provided by a combination of the second body portions 32. The depression CA can be used as positioning members for another cable holder. That is, in a case where a plurality of cable holders are stacked in accordance with the shape of an interface of a server (not illustrated), a projection (not illustrated) provided on the underside of another cable holder is made to engage with the depression CA, whereby the plurality of cable holders are neatly positioned and stacked one on top of another. In such a case, both the depression CA and the projection on the underside of the cable holder function as positioning members. In the case where a plurality of cable holders are stacked, copper foil or the like is desirably interposed between adjacent ones of the cable holders. Thus, electric characteristics of the cable assembly are stabilized.

The present invention is not limited to the above embodiments, and, needless to say, various changes can be made thereto without departing from the scope of the invention. For example, in each of the above embodiments, the signal line contacts 33 and the ground contacts 34, 40, or 50 are provided in the cable holder 30, 60, or 70 such that only the upper surfaces thereof are exposed to the outside. That is, the signal line contacts 33 and the ground contacts 34, 40, or 50 are insert-molded in such a manner as to be flush with the cable holder 30, 60, or 70. The present invention is not limited to such an embodiment. For example, the signal line contacts 33 and the ground contacts 34, 40, or 50 may be provided stepwise with respect to the cable holder 30, 60, or 70. In that case, the step of forming the signal conductors 21 (signal-conductor-exposed portions 20*a*) into stepped shapes can be omitted (see FIG. 6).

What is claimed is:

1. A cable assembly comprising:

a differential signal transmission cable including
  a pair of signal conductors,
  an insulator provided around the signal conductors, and
  an outer conductor provided around the insulator;

a signal-conductor-exposed portion in which portions of the signal conductors are exposed to an outside;

an outer-conductor-exposed portion in which a portion of the outer conductor is exposed to the outside, the outer-conductor-exposed portion being on a side of the signal-conductor-exposed portion in a longitudinal direction of the differential signal transmission cable;

a cable holder including
a first body portion at which the signal-conductor-exposed portion is placed, and
a second body portion at which the outer-conductor-exposed portion is placed;
signal line contacts provided on the first body portion and to which the signal conductors are connected, respectively;
a ground contact extending over the first body portion and the second body portion and to which the outer conductor is connected; and
a bonding-material-storing portion provided in the second body portion and storing a bonding material having conductivity that allows connection between the outer conductor and the ground contact.

2. The cable assembly according to claim 1, further comprising a leakage prevention wall for preventing leakage of the bonding material toward the first body portion, the leakage prevention wall being provided between the first body portion and the second body portion.

3. The cable assembly according to claim 1,
wherein the cable holder further includes a guide wall that guides attaching of the differential signal transmission cable to the cable holder, and
wherein at least one of a stepped portion provided by a combination of the insulator and the outer conductor and a stepped portion provided by a combination of the outer conductor and a protective covering provided around the outer conductor is in engagement with the guide wall.

4. The cable assembly according to claim 1,
wherein the differential signal transmission cable is one of a plurality of differential signal transmission cables,
wherein the first body portion is one of a plurality of first body portions that are provided side by side in a direction that is orthogonal to the longitudinal direction of the differential signal transmission cables, and
wherein the second body portion is one of a plurality of second body portions that are provided side by side in the direction that is orthogonal to the longitudinal direction of the differential signal transmission cables.

5. The cable assembly according to claim 4, wherein a partition is provided between adjacent ones of the second body portions such that the bonding-material-storing portion is divided into a plurality of bonding-material-storing portions.

6. A method of manufacturing a cable assembly, comprising:
preparing a differential signal transmission cable including a pair of signal conductors, an insulator provided around the signal conductors, and an outer conductor provided around the insulator, the preparing of a differential signal transmission cable including forming a signal-conductor-exposed portion in which portions of the signal conductors are exposed to the outside and an outer-conductor-exposed portion in which a portion of the outer conductor is exposed to the outside such that the outer-conductor-exposed portion is on a side of the signal-conductor-exposed portion in a longitudinal direction of the differential signal transmission cable;
preparing a cable holder including a first body portion at which the signal-conductor-exposed portion is to be placed, a second body portion at which the outer-conductor-exposed portion is to be placed, signal line contacts provided on the first body portion and to which the signal conductors are to be connected, respectively, a ground contact extending over the first body portion and the second body portion and to which the outer conductor is to be connected, and a bonding-material-storing portion provided in the second body portion and configured to store a bonding material having conductivity that allows connection between the outer conductor and the ground contact;
positioning the differential signal transmission cable with respect to the cable holder by placing the signal-conductor-exposed portion at the first body portion and the outer-conductor-exposed portion at the second body portion;
connecting the signal conductors and the signal line contacts to each other at the first body portion; and
connecting the outer conductor and the ground contact to each other by supplying the bonding material into the bonding-material-storing portion.

7. The method of manufacturing a cable assembly according to claim 6, wherein a leakage prevention wall that prevents leakage of the bonding material toward the first body portion is provided between the first body portion and the second body portion.

8. The method of manufacturing a cable assembly according to claim 6,
wherein the cable holder further includes a guide wall that guides attaching of the differential signal transmission cable to the cable holder, and
wherein at least one of a stepped portion provided by a combination of the insulator and the outer conductor and a stepped portion provided by a combination of the outer conductor and a protective covering provided around the outer conductor is made to engage with the guide wall.

9. The method of manufacturing a cable assembly according to claim 6,
wherein the differential signal transmission cable is one of a plurality of differential signal transmission cables,
wherein the first body portion is one of a plurality of first body portions that are provided side by side in a direction that is orthogonal to the longitudinal direction of the differential signal transmission cables, and
wherein the second body portion is one of a plurality of second body portions that are provided side by side in the direction that is orthogonal to the longitudinal direction of the differential signal transmission cables.

10. The method of manufacturing a cable assembly according to claim 9, wherein a partition is provided between adjacent ones of the second body portions such that the bonding-material-storing portion is divided into a plurality of bonding-material-storing portions.

* * * * *